US004001592B2

United States Statutory Invention Registration [19]

[11] Reg. Number: H1592

Nicholson

[45] Published: Sep. 3, 1996

[54] CELLULOSIC FOOD CASING

[75] Inventor: Myron D. Nicholson, Lemont, Ill.

[73] Assignee: Viskase Corporation, Chicago, Ill.

[21] Appl. No.: 275,889

[22] Filed: Jul. 15, 1994

Related U.S. Application Data

[60] Continuation of Ser. No. 135,647, Oct. 14, 1993, abandoned, which is a division of Ser. No. 822,506, Jan. 17, 1992, Pat. No. 5,277,857.

[51] Int. Cl.[6] ..... A22C 13/00

[52] U.S. Cl. ..... 428/34.8; 264/187; 264/203

[58] Field of Search ..... 428/34.8; 264/187, 264/203

[56] References Cited

U.S. PATENT DOCUMENTS

| | | | |
|---|---|---|---|
| 2,070,247 | 2/1937 | Weingand et al. . | |
| 2,141,776 | 12/1938 | Vautier et al. . | |
| 2,144,899 | 1/1939 | Smith . | |
| 2,176,925 | 3/1939 | Reichel et al. . | |
| 2,179,181 | 11/1939 | Graenacher et al. . | |
| 2,227,682 | 1/1941 | Wade . | |
| 2,901,358 | 8/1959 | Underwood et al. . | |
| 3,106,471 | 10/1963 | Firth . | |
| 3,158,492 | 11/1964 | Firth . | |
| 3,307,956 | 3/1967 | Chiu et al. . | |
| 3,334,168 | 12/1967 | Majewski et al. . | |
| 3,402,682 | 9/1968 | Peden et al. . | |
| 3,442,663 | 5/1969 | Turbak . | |
| 3,447,939 | 6/1969 | Johnson . | |
| 3,558,331 | 1/1971 | Tarika . | |
| 3,898,348 | 8/1975 | Chiu et al. . | |
| 3,905,397 | 9/1975 | Chiu . | |
| 3,981,046 | 9/1976 | Chiu . | |
| 4,060,361 | 11/1977 | Ziolko . | |
| 4,138,503 | 2/1979 | Ziolko . | |
| 4,142,913 | 3/1979 | McCorsley, III et al. . | |
| 4,144,080 | 3/1979 | McCorsley, III . | |
| 4,145,532 | 3/1979 | Franks et al. . | |
| 4,196,282 | 4/1980 | Franks . | |
| 4,246,221 | 1/1981 | McCorsley, III . | |
| 4,255,300 | 3/1981 | Franks et al. . | |
| 4,317,794 | 3/1982 | Gord et al. . | |
| 4,323,627 | 4/1982 | Joh . | |
| 4,356,218 | 10/1982 | Chiu . | |
| 4,416,698 | 11/1983 | McCorsley, III . | |
| 4,426,228 | 1/1984 | Brander et al. . | |
| 4,489,114 | 12/1984 | Bridgeford | 428/36 |
| 4,511,613 | 4/1985 | Nicholson . | |
| 4,540,613 | 9/1985 | Nicholson . | |
| 4,596,727 | 6/1986 | Higgins et al. . | |
| 4,814,034 | 3/1989 | Hansen et al. | 156/203 |
| 4,883,183 | 5/1989 | Vanderberg . | |
| 5,216,144 | 1/1993 | Eichinger . | |
| 5,252,284 | 10/1993 | Jurkovic . | |
| 5,358,765 | 10/1994 | Markulin | 428/34.8 |

FOREIGN PATENT DOCUMENTS

| | | |
|---|---|---|
| 1089700 | 11/1980 | Canada . |
| 1171615 | 7/1984 | Canada . |
| 006601 | of 0000 | European Pat. Off. . |
| 494852 | 7/1992 | European Pat. Off. . |
| 494851 | 7/1992 | European Pat. Off. . |
| 218121 | 1/1985 | Germany . |
| 55141 | of 1984 | Japan . |
| 1144759 | 3/1969 | United Kingdom . |

OTHER PUBLICATIONS

PCT International Search Report dated Apr. 29, 1993.

*Primary Examiner*—Charles T. Jordan
*Assistant Examiner*—Anthony R. Chi
*Attorney, Agent, or Firm*—Donna Bobrowicz; Roger Aceto

[57] ABSTRACT

Disclosed is a cellulosic food casing made from a nonderivatized cellulose and the various additives that can be incorporated onto or within the casing.

1 Claim, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

CELLULOSIC FOOD CASING

RELATED APPLICATIONS

This is a continuing application of U.S. Ser. No. 08/135,647, filed Oct. 14, 1993, now abandoned, which is a divisional application of U.S. Ser. No. 07/822,506, filed Jan. 17, 1992, now U.S. Pat. No. 5,277,857, issued Jan. 11, 1994.

Another application in this family is U.S. Ser. No. 08/179,418, filed Jan. 10, 1994 now U.S. Pat. No. 5,451,864. The disclosures of U.S. Pat. No. 5,277,857 and U.S. application Nos. 08/135,647 now abandoned and 08/179,418 now U.S. Pat. No. 5,451,364 are herein incorporated by reference.

TECHNICAL FIELD

The present invention relates to cellulose based products and more particularly to a tubular cellulose food casings and their additives and coatings.

BACKGROUND OF THE INVENTION

Cellulose food casings are well known in the art and are widely used in the production of stuffed food products such as sausages and the like. Cellulose food casings generally are seamless tubes formed of a regenerated cellulose and contain a plasticizer such as water and/or a polyol such as glycerin. Plasticization is necessary because otherwise the cellulose tube is too brittle for handling and commercial use.

Cellulose food casings generally are used in one of two forms. In one form the casing consists of a tubular film of pure regenerated cellulose having a wall thickness ranging from about 0.025 mm to about 0.076 mm and made in tube diameters of about 14.5 mm to 203.2 mm. The second form is a reinforced casing wherein the tubular wall of the casing consists of a regenerated cellulose bonded to a paper web. Such reinforced casings are commonly called "fibrous" casings to distinguish them from the nonreinforced cellulose casings. Fibrous casings have a wall in the range of 0.050 mm to 0.102 mm thick and are made in diameters of about 40.6 mm to 193 mm or greater.

The cellulose for making both types of casings is most commonly produced by the so-called "viscose process", wherein viscose, a soluble cellulose derivative, is extruded as a tubular film through an annular die into coagulating and regenerating baths to produce a tube of regenerated cellulose. This tube is subsequently washed, plasticized with glycerin or other polyol, and dried. Drying usually is accomplished while the tube is inflated with air at a pressure sufficient both to maintain a constant tube diameter and to orient the film.

The viscose process for making cellulose is well known in the art. Briefly, in the viscose process a natural cellulose such as, wood pulp or cotton linters, is treated with a caustic solution to activate the cellulose to permit derivatization and extract certain alkali soluble fractions from the natural cellulose. The resulting alkali cellulose is shredded, aged and treated with carbon disulfide to form cellulose xanthate which is a cellulose derivative. The cellulose xanthate is dissolved in a weak caustic solution. The resulting solution or "viscose" is ripened, filtered, deaerated and extruded. The pulp source and time of aging the alkali cellulose are selected depending upon whether the viscose will be used to make fibrous casing or nonreinforced cellulose casing. Fibrous casing uses a less viscous solution because the lower viscosity solution wicks into the paper web, completely penetrating the web, establishing strong intercellulose bonding. A more viscous solution is used to extrude a nonreinforced cellulose casing.

The viscose is extruded as a tube through an annular die and about a self-centering mandrel into coagulation and regenerating baths containing salts and sulfuric acid. In the acidic baths the cellulose xanthate, e.g., viscose, is converted back to cellulose. In this respect the acid bath decomposes the cellulose xanthate with the result that a pure form of cellulose is coagulated and regenerated. Initially, the coagulated and regenerated cellulose is in a gel state. In this gel state the cellulose tube first is run through a series of rinse water dip tanks to remove by-products formed during regeneration. The gel tube then is treated with a glycerin humectant and dried to about 10% moisture, based on total casing weight. The gel tube is inflated during the drying process to a pressure sufficient to provide a degree of orientation to the dried cellulose tube.

Both nonreinforced cellulose casings and fibrous casings are produced in this fashion except that in the case of fibrous casings the viscose is extruded onto a tube of paper prior to entering the coagulation and regenerating baths.

During regeneration of the cellulose from the xanthate solution, sulfur products are liberated and gases such as hydrogen sulfide, carbon disulfide and carbon dioxide are released through both the inner and outer surfaces of the gel tube. The gases produced as by-products during regeneration are noxious and toxic, so their containment and recovery imposes a considerable burden on the manufacturing process. Moreover, gases generated at the internal surface of the extruded tube can accumulate within the tubular casing and consequently present special problems. The tubular casing, while in its gel state, is expansible and the pressure build up of gases accumulating within the gel casing causes undesirable diameter variations. To prevent this, the gel casing is punctured periodically to vent the accumulated gases. This puncturing process, involving procedures to puncture, vent, and then seal the punctured gel tube, results in an undesirable interruption of the manufacturing process. Also, gases which evolve within the casing wall may become entrapped causing bubbles which weaken the casing and detract from its stuffability.

The casing in its gel state to some extent retains low residual levels of the sulfur compounds produced during regeneration. While care is taken to remove all residual sulfur compounds by washing the gel tube prior to drying, the dried casing may still contain trace amounts of these compounds.

Despite the problems inherent with the viscose process as described above, nevertheless it is the most commonly used process for the production of cellulose casing for the food processing industry.

An alternate cellulose production method involves forming a cellulose solution by means of a simple dissolution rather than requiring prior derivatization to form a soluble substance. A cellulose dissolution process is described in U.S. Pat. No. 2,179,181. This patent discloses the dissolution of natural cellulose by a tertiary amine oxide to produce solutions of relatively low solids content, for example, 7 to 10% by weight cellulose dissolved in 93 to 90% by weight of the tertiary amine. The cellulose in the resulting solution is nonderivatized prior to dissolution. U.S. Pat. No. 3,447,939 discloses use of N-methyl-morpholine-N-oxide (NMMO) as the cyclic amine solvent where the resulting solutions, while having a low solids content, can be used in chemical reactions involving the dissolved compound or to precipitate the cellulose to form a film or filament.

More recent patents such as U.S. Pat. No. 4,145,532 and U.S. Pat. No. 4,426,288 improve upon the teachings of the '939 patent. U.S. Pat. No. 4,145,532 discloses a process for making a solution of cellulose in a tertiary amine oxide such as NMMO that contains 10–35% by weight of cellulose. This higher solids content, achieved in part by including an amount of water (from 1.4% to about 29% by weight) in the tertiary amine oxide solvent, provides a solution adapted for shaping into a cellulosic article such as by extrusion or spinning. In U.S. Pat. No. 4,426,288, the NMMO-cellulose solution contains an additive which reduces decomposition of the cellulose polymer chain so that molding or spinning substances are obtained with only slight discoloration and that will yield molded shapes distinguished by improved strengths upon precipitation in a nonsolvent such as water.

Cellulose dissolution generally occurs by four methods: it behaves as an electron donor base, or an electron acceptor acid, or complexes with another reagent, or forms a derivative in which the cellulose is covalently bonded through alcohol groups with various reagents to form new molecules. The latter includes sodium cellulose xanthate, ie., cellulose being an alcohol can react to make esters such as a xanthate derivative that is soluble in aqueous, nonaqueous or strongly polar organic solvents. The solubilization is mainly due to the disrupting of the hydrogen bonding by the derivative bonds. The salient feature of this step is that the derivatizing groups can be easily removed by hydroxylic materials such as, for example, aqueous acid, yielding pure cellulose. When dissolved by a derivatization process, the cellulose is truly regenerated, whereas when dissolved by complexation or solvation of pure cellulose, as in the first three mentioned types of dissolution, the cellulose is mainly precipitated or coagulated, i.e., reorganized into a shape. Notwithstanding these differences, the resulting cellulose article is chemically identical irrespective of whether it is reprecipitated from solutions or chemically regenerated.

Using NMMO as a solvent for cellulose eliminates the need for derivatizing the cellulose as in the viscose process. Consequently, it eliminates the disadvantages attendant to the viscose process, such as, the problems associated with the generation of toxic and noxious gases and sulfur compounds.

However, while nonderivatized cellulose resulting from the process of dissolving cellulose in NMMO eliminates certain problems associated with the viscose process, to applicant's knowledge, NMMO-cellulose solutions have not yet been used in the manufacture of cellulose food casings. It is speculated that nonderivatized cellulose has not been commercially used in manufacture of food casings because the solution at 65° C. has a viscosity significantly higher than the viscosity of derivatized cellulose used in the production of cellulose food casings. In particular, nonderivatized cellulose in solution may have a molecular weight of about 80,000 to 150,000 and a viscosity in the range of about 1,000,000 to 3,500,000 centipoise. The high molecular weight and viscosity results because the dissolution of the cellulose does not affect the degree of polymerization. Viscose for casing manufacture, where the degree of polymerization is affected by the derivatization process, has a molecular weight in the range of about 95,000 to 115,000 for nonfibrous casing and a viscosity of 5,000 to 30,000 centipoise.

From a cellulose article manufacturing process standpoint, these differences are important because after dissolution the process steps, including cellulose recovery, are dependent on whether cellulose has entered into a covalent bond with the solubilizing reagent, i.e., has been derivatized. This is so in the case of the well-known and commercially practiced viscose process. When a cellulose derivative is processed into the shaped article, the derivative, such as viscose, is first partially coagulated in the extrusion bath and then subsequently hydrolyzed back to cellulose, i.e., cellulose is regenerated. During this hydrolysis and while the derivative is still in a "plastic" state, the reforming cellulose crystallites can be stretched and oriented to give desirable-commercial properties such as high tensile strength or burst strength. However, a disadvantage of this general approach is that since a cellulose derivative has been hydrolyzed, additional byproducts are formed. This significantly complicates cellulose recovery.

By contrast, in the nonderivative cellulose dissolution methods such as NMMO/$H_2O$, orienting the cellulose molecules during the reorganization of the cellulose article is more difficult because there is no covalent bond to break. So, reorganization is essentially a physical dilution or decomplexation. However, recovery is less complex and, at least in the cellulose/NMMO/$H_2O$ system, commercially feasible.

U.S. Pat. No. 4,246,221 and East German Patent No. DD 218 121 have taught that such nonderivatized cellulose containing mixtures with NMMO and water may be forced through a nozzle and longitudinally guided through a 12 inch long air gap into a precipitating bath to form very small diameter solid fibers. More recently, the nonderivatized cellulose fiber spinning literature teaches that such long air path lengths should be avoided. For example, U.S. Pat. No. 5,252,284 ("'284"), states that a long air gap leads to sticking of the fibers, uncertainties in spinning and fiber breakage at high degrees of drawing. According to '284, by using selected orifice diameters and nozzle channel lengths, the air gap is desirably reduced to at most 35 mm (1.4 inches).

However, the manufacture of individual solid cellulose fibers by extrusion through orifices of 2–4 mils diameter is nonanalogous to manufacture of cellulose food casings which are extruded as a hollow tube of at least about 700 mils inside diameter with wall thickness typically on the order of 40 mils.

Food casings made of derivatized cellulose typically contain additives or coatings to enhance food processing and food characteristics. For example, colorants are incorporated in or on the casing to make self-coloring casings, which transfer the color during processing of the food product from the casing to the food product. Liquid smokes, which impart a smoky flavor and a reddish color to the food product, are also incorporated in or coated on the casing. Peeling aids that allow the casing to be completely stripped off the cooked meat product without causing any of the meat product to be damaged, are also added to the casings.

Casings are made in a variety of colors. Dye pigments are incorporated into the cellulose prior to extrusion to produce these colored casings. At times, printing is needed on the outside of the casing. Certain dyes and pigments can be used to print whatever is needed on the casing.

While the ability of a derivatized cellulose casing to accept these additives and coatings has been demonstrated, there has been no experience nor expectation that a nonderivatized cellulose casing would likewise accept these coatings and additives. Accordingly, it is a principle object of the present invention to provide a cellulosic food casing made from nonderivatized cellulose that incorporates a coating or additive that enhances the performance of the food casing and a method for preparing the same. Typical additives or coatings desirable for incorporation into the casing especially are those that transfer colors or flavors to the food product from the casing, those that assist in the peeling of the casing from the meat, and the dyes that are used to print on the surface of the casing.

SUMMARY OF THE INVENTION

It now has been unexpectedly found that nonderivatized cellulose solutions are suitable for use in making both cellulose and fibrous food casings and that these casings can incorporate various coatings and additives, either onto the casings or be incorporated within the casing. Nonderivatized cellulose/NMMO dope in a molten state can be extruded as a tubular film into a nonsolvent liquid such as a water bath.

For purposes of this specification, "nonderivatized" cellulose means a cellulose which has not been subjected to covalent bonding with a solvent or reagent but that has been dissolved by association with a solvent or reagent through van der Waals forces or hydrogen bonding.

"Nonderivatized cellulose casings" and "nonderivatized cellulosic casings" mean food casings prepared from nonderivatized cellulose as defined above.

"Derivatized cellulose casings" and "derivatized cellulosic casings" mean food casings prepared by the regeneration of a derivatized cellulose, preferably employing the viscose process as described above.

"Nonsolvent" means a liquid which is not a cellulose solvent.

In the water bath, the nonderivatized cellulose precipitates and the resulting gel tube can be treated with water, a polyhydric alcohol such as glycerin, or other water soluble softening agent such as a polyalklyene oxide or a polyalklyene glycol prior to drying. Based on an evaluation of food casings extruded using the nonderivatized cellulose solution, it appears that such casings unexpectedly have a higher water permeability than casings of derivatized cellulose from the viscose process. Water permeability is of considerable importance for food casings since the processing of food stuffed casings often involves cooking or curing processes which require moisture and flavoring components to pass freely through the casing material. Moreover, based on an evaluation of casings of nonderivatized cellulose, it appears that such casings are stronger than casings made with cellulose derived from the viscose process. Improving moisture permeability while maintaining or improving strength is unexpected since previous attempts to increase the water permeability of the casing made with derivatized cellulose resulted in a lowering of casing strength.

Casings made of a nonderivatized cellulose also have a greater resistance to tearing when wet than their viscose cellulose counterparts. Wet tear resistance is an important property for food casings as it is a measure of the ability of the casing to withstand abuse imparted by the rigors of shirring and stuffing. For example, it is not uncommon for poorly maintained stuffing equipment to nick or otherwise damage the casing during the stuffing process with the result that the casing tears and fails under the stuffing pressures. Consequently, it is important that the casing be able to receive some amount of damage without failing.

The nonderivatized cellulose can be utilized to form fibrous casing by flowing the molten NMMO-cellulose solution onto a paper web prior to precipitating the cellulose. This is surprising and unexpected because the NMMO-cellulose solution applied to the paper web does not cause an obvious visible degradation of the paper even though the NMMO component of the solution is a cellulose solvent.

The surprising advantages of a cellulose food casing which has improved wet tear resistance with no loss of strength or water permeability, which is sulfur free, and which is formed by a process that does not generate toxic and noxious by-products, are all attainable through the use of a nonderivatized cellulose to form the food casing.

In particular, the present invention is a cellulose food casing comprising a sulfur free seamless extruded tubular film of a nonderivatized cellulose precipitated from a cyclic amine oxide solution of cellulose dissolved in N-methylmorpholine-N-oxide, which can be said to exhibit thermoplastic-like properties, and where the tubular film contains a water soluble softener and an additive such as a peeling aid, a coloring agent, and a flavoring agent.

Food casings of nonderivatized cellulose were found to have all the desirable attributes of food casings formed from a derivatized cellulose. They imbibe water and are treated with glycerin or other softeners necessary to provide the casing with the pliability needed for processing; they are moisture permeable, which is necessary for processing the food product stuffed into the casing; they adsorb, incorporate, or are coatable with peeling aids, anti-pleat lock agents, and flavoring and coloring agents; they are extensible and able to be stuffed with a food product and to contain the food product during a cooking cycle without splitting; they accept coloring agents to produce colored casings; and it is possible to print on these casings. All these attributes are in addition to being more tear resistant than conventional cellulose casings and being completely free of even trace amounts of process generated sulfur compounds.

DETAILED DESCRIPTION OF THE INVENTION

Figure 1:
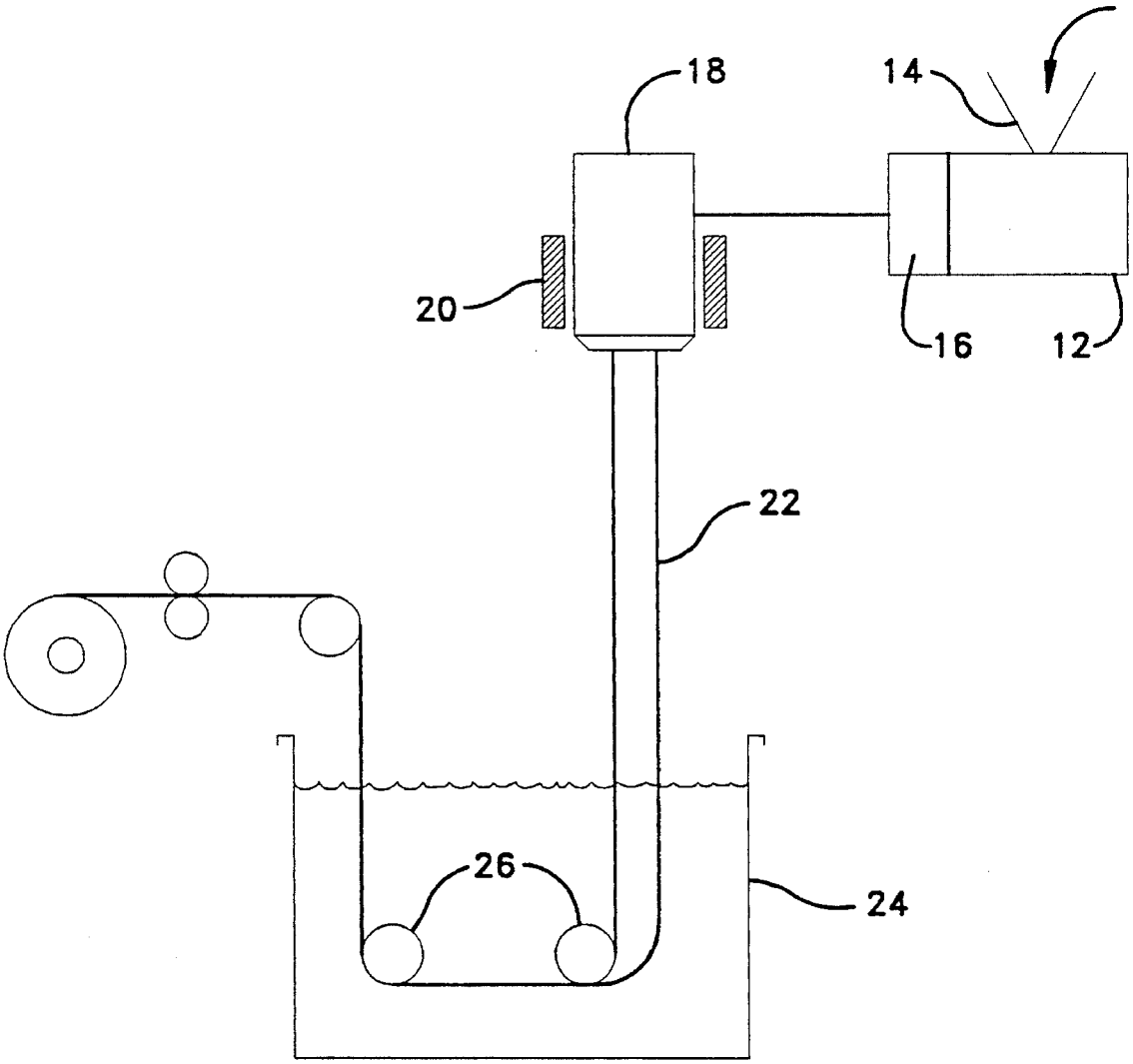
FIG. 1 is a schematic drawing showing an arrangement of apparatus for extruding the food casing of the present invention.

Several tests were conducted to establish the feasibility of using nonderivatized cellulose to form cellulose food casings and to determine the properties of food casings so formed.

For purposes of testing, a NMMO-cellulose solution was obtained from Courtaulds Research Ltd., Coventry, England. The test solution, or "dope", is a yellow/brown solid having a melting point of 60°–70° C. The Material Safety Data Sheet for the dope identifies it as containing, by weight, 70–80% NMMO, 10–20% cellulose and 5–15% water. It is believed the dope as supplied is made according to processes described in U.S. Pat. Nos. 4,145,532, 4,196,282 and 4,255,300, the disclosures of which are incorporated herein by reference.

Although the cellulose generally used in this type of process comes from wood or cotton, cellulose is also found in and may be used from various other sources, such as, mulberry leaves, hemp, flax, jute, grasses, straws, cork, and sugar cane. Other possible sources of cellulose include certain bacteria, fungi, yeast, and marine algae.

The dope, received as slabs, was put into a freezer to increase its brittleness. It was then hammered into smaller pieces and ground to a particle size of less than about 1.58 mm in diameter.

Water in the dope solution probably weakens the cellulose-to-cellulose hydrogen bonding enough so that the NMMO molecule, which by itself would not be strong enough to rupture a cellulose hydrogen bond from another cellulose molecule, can wedge between and solvate the cellulose chains. This causes plasticization and with sufficient heat, time and mechanical shearing, dissolves the cellulose. This action may possibly also be provided by hydroxylic molecules other than water, as for example, methanol and formamide. In principle, a method for practicing the present invention could be developed using a dope containing either no water or substantially reduced water. However, recovery of the expensive NMMO for recycling would be very complicated by addition of the third component to the dissolving medium.

These particles were then loaded into a Brabendar Model 100 screw-type extruder feeding a die assembly arranged to extrude a tube approximately 25.4 mm in diameter. The extruder and die temperatures were held at about 105° C. The extruded dope was passed sequentially through a screen pack profile of 60/200/325/200/60 mesh screens located between the extruder and die. The screen pack prevents partly melted dope and other contaminants from being extruded and increased the residence time of the dope in the extruder. This insures that the dope is thoroughly melted prior to extrusion.

The die is positioned to extrude a tube downwardly into a water bath held at a temperature of about 15° C. Between the die and water surface was an air gap of about 50 mm. With this arrangement the extruder was operated at about 50 RPM at a feed rate of about 1.13 to 1.36 kg/hr. The residence time of the extruded tube in the water bath was about one minute and from the bath the tube was drawn through nip rolls and wound on a spindle.

FIG. 1 illustrates the test apparatus used in a laboratory pilot operation. In this respect the extruder 12 includes a hopper 14 into which the pulverized dope is fed. The screen pack 16 is between the extruder and the die 18. Band heaters 20 adjacent to the die maintain the die at about 105° C. as noted above. The die is oriented so the extruded tubular food casing 22 passes vertically down into water bath 24. As extrusion begins, the tube is held open so it fills with water as it enters the bath and is laced around rollers 26. Water within the tube prevents the tube from blocking (i.e., self-adhering) as it is flattened in its passage around rollers 26.

Figure 2:
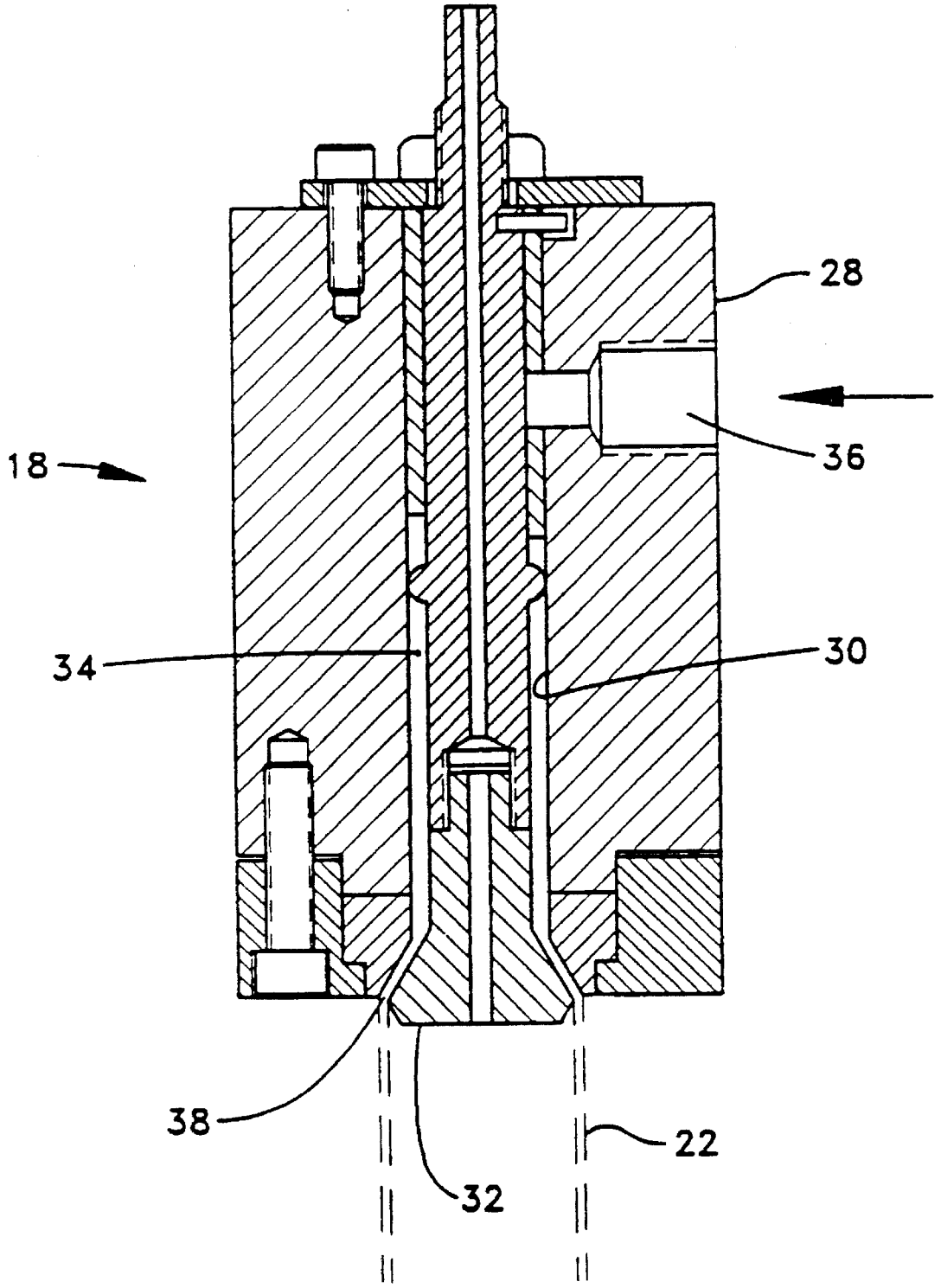
FIG. 2 is a view of an extrusion nozzle partly broken away and in section as used in the apparatus of FIG. 1.

The die 18 is shown in cross section in FIG. 2. The die includes an outer member 28 having a central bore 30. Centered within this bore is a plug 32. The plug and bore surface define an annular space 34 therebetween wherein the space at the outlet 38 defines a gap about 0.508 mm wide and 25.4 mm in diameter. Molten dope introduced into this space through inlet 36 flows down and around the mandrel and is extruded as a tube from outlet 38.

Tubes extruded in the manner described above were washed in water to remove all NMMO and then samples were soaked in a 10% glycerin solution for ten minutes. Next, the tubes were inflated with air and dried, where the pressure of the inflating air was sufficient to maintain the tube open during drying. The wall thickness of the tubes extruded in this experimental operation were not as uniform as the wall thickness of commercially extruded viscose from a conventional casing manufacture. For example, in one casing sample formed of the nonderivatized cellulose dope, the wall thickness at points about its circumference ranged between 0.06 to 0.11 mm whereas a conventional derivatized viscose cellulose casing is a relatively uniform 0.06 mm thick. In any event, this test established that the derivatized dope could be extruded in tubes having a wall thickness down to at least 0.06 mm.

Water Permeability

To analyze the water permeability characteristics, a length of the nonderivatized cellulose tube was soaked in water (25° C.) for about five minutes and thereafter discs 38 mm in diameter were cut from the soaked length. The soaked disc was inserted into an Ultrafiltration Cell as sold by Amicon Corporation (Model 52) having a polyethylene plate to support the test sample. Water at 25° C. under pressure of 500 mm Hg was introduced into one side of the cell. A pipette attached to the other side of the cell collected the water passing through the casing sample. The data collected was then used to calculate the water permeability of the test sample. The resulting calculation represents a water permeation or ultrafiltration rate per unit area per unit of applied pressure, the specific units being ml/min/$M^2$/mm Hg. Three samples of the nonderivatized cellulose were analyzed in this fashion. For purposes of comparison, a section of food casing of derivatized cellulose made according to the viscose process was obtained from a commercial production line for NoJax® casings (registered trademark of Viskase Corporation, Chicago, Ill., USA), while still in a gel state (after regeneration, rinsing and treating with glycerin but prior to drying). This gel casing was inflated with air to maintain it open during drying and thereafter it was subjected to the same permeability test. The calculation results are shown in Table I.

TABLE I

| | Permeability | |
|---|---|---|
| | Ultrafiltration (ml/min/$M^2$/mm Hg) | |
| Sample | Nonderivatized | Derivatized |
| 1 | 2.53 | 1.02 |
| 2 | 1.33 | 1.00 |
| 3 | 1.19 | 0.94 |
| Average | 1.68 | 0.98 |

The analyses results of Table I indicate that the water permeability of casing tested which was formed of the nonderivatized cellulose is greater than that of the derivatized samples.

Stretch Burst

The strength of the nonderivatized cellulose casing was analyzed by a so called "stretch burst" test. This test involves soaking a section of the casing in room temperature water for thirty minutes to insure it is in a rewet condition. In its rewet condition one end of the sample is tied off and the sample is inflated with air at a rate of pressure increase of about 44.52 mm Hg/sec until it bursts. The diameter increase during inflation and the diameter at burst are recorded. The sample of casing formed from nonderivatized cellulose tested had a rewet flat width of 49.5 mm (31.5 mm diameter). In the test it attained a diameter of about 48.0 mm and burst at an internal pressure of 203 mm Hg.

For a burst pressure comparison, a length of derivatized cellulose food casing in a gel state was removed from a commercial production line after treating with glycerin but prior to drying. This gel state casing was intended for production of a conventional frankfurter casing known as Viskase Corporation's size 25N NoJax® casing. This gel state casing was treated in the same manner as the nonderivatized casing noted above, i.e., inflated with air to facilitate drying with no attempt to orient it by inflating to impart a stretch to the casing. The casing then was rewet in the same manner as the nonderivatized cellulose casing sample and subjected to the stretch burst test. In its rewet condition the flat width of three samples averaged 35.47 mm (22.6 mm diameter). The average burst pressure was 271.33 mm Hg and the average diameter at burst was 37.33 mm. The burst pressure was higher than that of the nonderivatized sample. However, all factors being equal, burst pressure is determined in part by casing diameter in that the smaller diameter casing will have the higher burst pressure. Accordingly, it is believed that this increase, at least in part, was due to the fact that the average diameter of the derivatized cellulose sample was smaller than the nonderivatized cellulose sample.

As a further attempt to compare burst pressures, two oriented casings of the Viskase Corporation formed of derivatized cellulose were selected for comparison of the rewet burst pressures. One known as Viskase size 40G NoJax® casing was selected because it is specified as having a flat width (48.77 to 52.83 mm) comparable to the sample of nonderivatized cellulose. Viskase specifications for this size 40G casing includes a minimum burst pressure of 173 mm Hg wherein burst pressure is determined according to the same procedure noted above. The second casing known as Viskase size HS 65 casing has a greater specified flat width of 55.37 to 65.02 mm, and the Viskase specifications for this size HS 65 casing includes a burst minimum pressure of 171 mm Hg. These minimum values are lower than the burst pressure of 203 mm Hg obtained when testing the casing of nonderivatized cellulose.

It also is known that a casing formed of derivatized cellulose has a higher burst pressure after orientation, done by drying while inflated to stretch the casing, than without such orientation. The casings formed of nonderivatized cellulose used in the stretch burst test were not oriented whereas the specified burst pressure for the Viskase casings noted above are for oriented casings. Accordingly, it is believed that if oriented, the casings formed of the nonderivatized cellulose will have still higher burst pressures than comparable casings formed of derivatized cellulose.

Tear Strength

Tear strength in both the machine (MD) and transverse (TD) directions of casing formed of nonderivatized cellulose also was tested. Samples to be tested were cut as rectangles from both nonderivatized cellulose and size 25 N NoJax® gel state casing extruded and treated as noted above. One group of three samples was taken such that one side (A) of each sample is cut perpendicular to the MD direction. A second group of three samples was taken such that one side (B) is cut perpendicular to the TD direction. A slit for initiating the tear was made in each sample. Each slit started at the middle of one side (A) or (B) and extended in the direction to be tested. The samples were soaked in demineralized water for thirty (30) minutes, measured for thickness and then fixed to a DuPont Pendulum-type tear tester. The sample is arranged so that when the pendulum of the instrument is released, the weight of the swinging pendulum will tear the sample in half wherein the tear is initiated by the slit cut into one side. A scale of the instrument records a value representing the tear force in gram-centimeters required to tear the sample. This value is used to calculate the tearing force per millimeter of film thickness.

Casings made of both derivatized and nonderivatized samples were tested using the same test procedures. The results of the tear test on samples formed of the derivatized cellulose are shown in Table II. Table III shows the results of tear tests on samples cut from tubular film formed of nonderivatized cellulose.

TABLE II

Tear Strength - Derivatized Cellulose

| Sample | Thickness (mm) | MD Tear Force (gm-cm) | gm-cm per 0.1 m |
|---|---|---|---|
| 1 | 0.063 | 10.5 | 16.6 |
| 2 | 0.063 | 10.9 | 17.3 |
| 3 | 0.065 | 12.5 | 19.2 |
| 4 | 0.066 | 13.2 | 20.0 |
| Average MD Tear Force/0.1 mm | | | 18.28 |
| **Sample** | **Thickness (mm)** | **TD Tear Force (gm-cm)** | **gm-cm per 0.1 m** |
| 1 | 0.065 | 18.0 | 27.6 |
| 2 | 0.066 | 21.4 | 32.4 |
| 3 | 0.066 | 19.4 | 29.3 |
| 4 | 0.066 | 19.6 | 29.7 |
| Average TD Tear Force/0.1 mm | | | 29.75 |

TABLE III

Tear Strength - Nonderivatized Cellulose

| Sample | Thickness (mm) | MD Tear Force (gm-cm) | gm-cm per 0.1 m |
|---|---|---|---|
| 1 | 0.098 | 42.9 | 43.7 |
| 2 | 0.124 | 66.5 | 53.6 |
| 3 | 0.149 | 69.2 | 46.4 |
| Average MD, Tear Force/0.1 mm | | | 47.9 |
| **Sample** | **Thickness (mm)** | **TD Tear Force (gm-cm)** | **gm-cm per 0.1 m** |
| 1 | 0.120 | 35.7 | 29.8 |
| 2 | 0.154 | 73 | 47.4 |
| 3 | 0.160 | 67.3 | 42.1 |
| 4 | 0.169 | 103.4 | 61.2 |
| Average TD Tear Force/0.1 mm | | | 45.1 |

A comparison of the results show that on average, the tear strength per 0.1 mm of thickness is significantly greater in both the MD and TD directions for the tubular film formed of nonderivatized cellulose. Particularly, the MD tear strength on average is over 2.5 times greater and the TD tear strength is 1.5 times greater. This is important because as discussed above, wet tear strength is an indication of the ability of the casing to withstand the rigors of stuffing. Tear strength also is important during casing converting operations prior to stuffing. For example, food casings such as those used to process frankfurters and the like typically are converted by a shirring operation (i.e., longitudinally compressing into closely packed pleats) so as to gather a long length of casing into shorter tubular sticks. It is not uncommon for a shirring operation to compact upwards of sixty (60) meters of casing to a length of only 76 cm. The shirring process itself is conducted at speeds of up to 360 meters per minute. Accordingly, it is important that the casing be able to maintain physical integrity and not tear during the shirring operation. Thus, for both processing (shirring) and stuffing considerations, it is desirable to have a casing with high tear strength.

Stuffing tests were conducted to determine if casings made of a nonderivatized cellulose were suitable for food processing. Several pieces of the casing, formed, treated with glycerin and dried as noted above, were tied at one end and hand stuffed with a high collagen frankfurter emulsion. Some casings split on stuffing due to weak spots caused by pinholes or bubbles in the casing wall. Those samples which were successfully stuffed were processed after stuffing by cooking at 82° C. and 40% relative humidity (RH) for 75 minutes to simulate conditions in a commercial operation. Casings of nonderivatized cellulose, stuffed and processed in this fashion, did not split or otherwise rupture during cooking, indicating a suitability for use as food casings.

The die used to produce casing for the previous tests was replaced with a nozzle arrangement having some features similar to a nozzle used in the production of cellulosic frankfurter casing from viscose. A typical viscose extrusion nozzle for producing cellulose food casing includes a self centering mandrel which extends out from the body of the nozzle. The nozzle is located below the level of the regenerating liquid and is oriented so the extruded viscose tube passes vertically upward from the nozzle and along the mandrel up and out of the regenerating liquid.

For purposes of extruding the molten nonderivatized dope, modifications as described below were made to facilitate the extrusion of the more viscous thermoplastic dope of nonderivatized cellulose and the nozzle was arranged to extrude downwardly into the nonsolvent bath.

Figure 3:
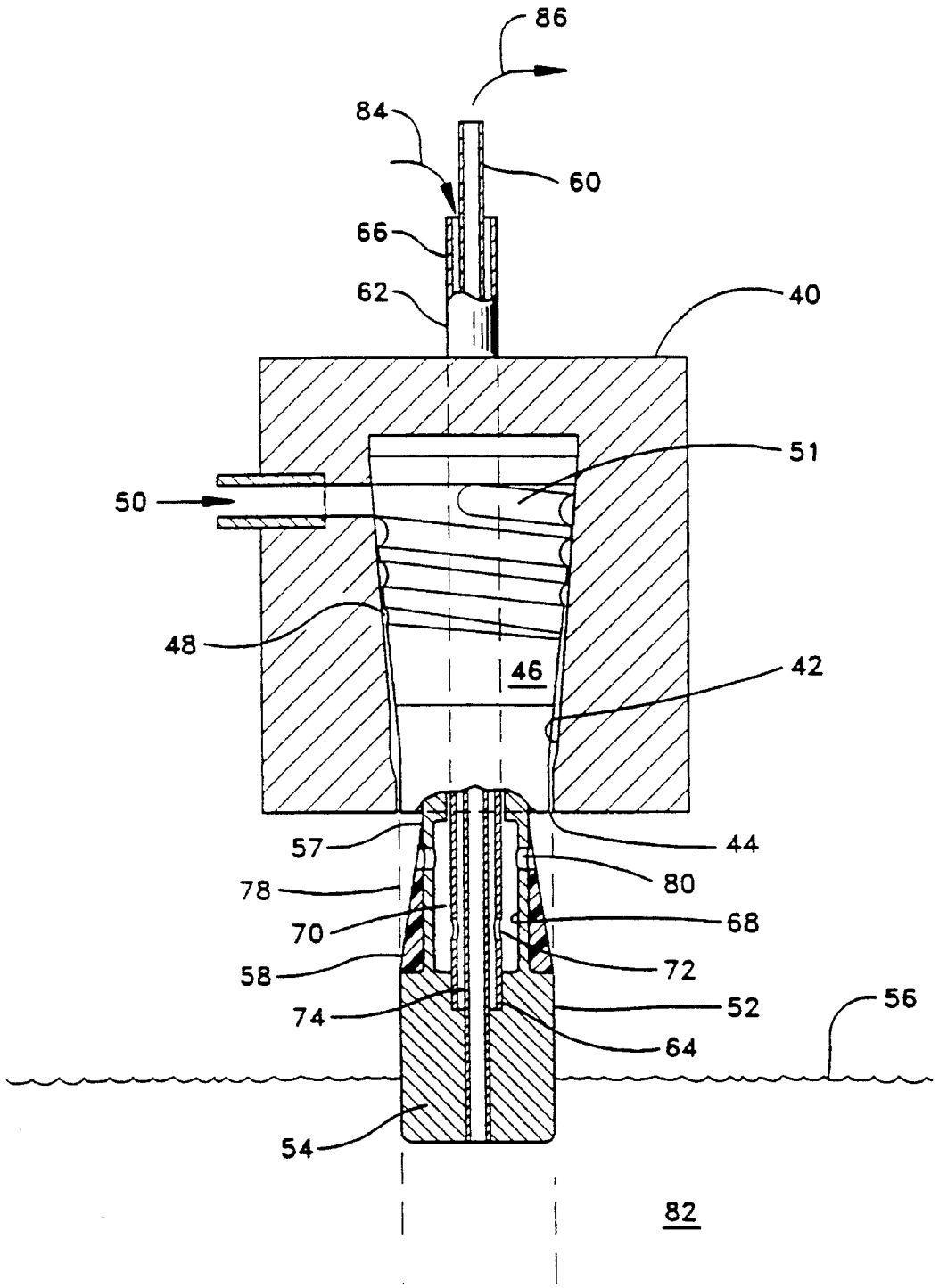
FIG. 3 is a view similar to FIG. 2 showing an alternate extrusion nozzle.

FIG. 3 shows the extrusion nozzle to include an outer member 40 having a central bore 42 which tapers towards an outlet 44. Centered within the bore is a tapered plug 46. An annular extrusion passage 48 is defined between the plug and the bore surface wherein the passage outlet 44 is about 0.25 mm wide and about 23.6 in diameter.

The molten dope from the extruder (FIG. 1) enters extrusion passage 48 through an inlet port 50 and then flows around and along the plug to the extrusion passage outlet. The surface of the plug is provided with a spiral channel 51 intended to facilitate the even distribution and passage of the molten dope around and along the plug.

Extending axially from the plug and out of the bore is a hollow mandrel 52. The lowermost end portion 54 of the mandrel, in use, is disposed below the level of the precipitating liquid indicated at 56.

The lowermost end portion 54 has a diameter about equal to the diameter of the extrusion passage outlet 44. However, a length of the mandrel between its lowermost end portion and the extrusion outlet is relieved to provide a seat 57. Retained in this seat is a sleeve 58 formed of a relatively low friction material such as tetrafluroethylene. The sleeve is tapered from a smaller end adjacent the extrusion outlet 44 to a larger end which matches the diameter of the mandrel end portion 54. The tapered, low friction surface provided by this sleeve facilitates the passage of the extruded tube along the mandrel and into the precipitating liquid.

FIG. 3 further shows that a central conduit 60 extends axially completely through the mandrel and plug. A second conduit 62, disposed concentrically about the first and which extends upward through the plug, has a closed lower end 64 and an open upper end 66. This second conduit 62 and the inner wall 68 of the hollow mandrel define an annular channel 70. A first port 72 in the wall of the second conduit connects the space 74 between the concentric conduits 60 and 62 to the space 70 between the second conduit and the inner surface of the hollow bore. A second port 80 extends through the wall of the mandrel and the sleeve. This second port 80 is located adjacent the smaller sleeve diameter and above the level of the nonsolvent precipitating liquid.

The concentric conduits 60 and 62 permit the circulation of the precipitating liquid to the interior of the extruded nonderivatized cellulose. In particular, the precipitating liquid from bath 82 is pumped, by means not shown, into the space 74 between the concentric conduits through its open top 66 as indicated by arrow 84. This liquid flows through port 72 into space 70 and then out of the mandrel through port 80. This liquid, which flows down along the surface of the sleeve 58 and the mandrel lower portion 54, performs several functions. First, it lubricates to facilitate the passage of the extruded nonderivatized cellulose tube (represented in FIG. 3 by dashed line 78) down along the mandrel and into the bath 82. It also fills the extruded tube to facilitate precipitation of the cellulose at the inner surface of the extruded tube. The liquid from within the extruded tube is pumped out through the central conduit 60 as indicated by arrow 86 and back to the bath.

Using this extrusion nozzle with the same dope and extrusion conditions as previously noted, a tube of the NMMO-cellulose solution was extruded into a 25° C. bath containing 30% NMMO and 70% water by volume. At this concentration, the combination of water and NMMO is a nonsolvent for the cellulose.

The residence time of the extruded tube in the bath was about one minute. This was sufficient to precipitate the nonderivatized cellulose from the solution. The extruded tube was washed with water and immersed in a 10% glycerin solution for ten minutes. The tube was then inflated with air and dried to produce casing samples for testing. The casing sample produced in this manner contained 38% glycerin by weight of dry cellulose and had a flat width after rewetting of about 30.7 mm (19.57 mm diameter). These casings were then subjected to the same permeability, stretch-burst and tear tests as previously described.

A conventional gel state casing of derivatized cellulose was used as a control. This gel state casing was taken from the production line of Viskase Corporation for manufacturing its size 25N NoJax® casing because the specified flat width (26.9 mm) diameter (17.2 mm) of this size casing is close to the flat width and diameter of the casing of nonderivatized cellulose produced with the modified extrusion nozzle. The gel state casing was taken at a stage of production after contacting with glycerin and before drying. At this stage the casing has about 13–14% glycerin. It was then inflated just to hold it open and air dried. The resulting casing of the derivatized cellulose had a rewet flat width of 29.46 mm (18.76 mm diameter), so it was still slightly smaller in diameter than the nonderivatized cellulose sample.

The nonderivatized casing produced with the modified extrusion nozzle was thinner and more uniform than previous samples produced. Table IV shows the thickness of eight rewet samples measured at three points around its diameter.

TABLE IV

| Sample | Casing Wall Thickness (mm) 1 | 2 | 3 | Average |
|---|---|---|---|---|
| 1 | 0.060 | 0.058 | 0.050 | 0.056 |
| 2 | 0.104 | 0.072 | 0.083 | 0.084 |
| 3 | 0.058 | 0.065 | 0.049 | 0.057 |
| 4 | 0.078 | 0.087 | 0.053 | 0.073 |
| 5 | 0.056 | 0.053 | 0.042 | 0.050 |
| 6 | 0.056 | 0.053 | 0.042 | 0.050 |
| 7 | 0.067 | 0.066 | 0.049 | 0.061 |
| 8 | 0.039 | 0.062 | 0.051 | 0.051 |

Table IV shows casings were produced having a wall thickness on average of as small as 0.050 mm with a wall thickness uniformity better than that produced by the die of FIG. 2. On average, the wall thickness of these eight samples ranged from 0.050 mm to 0.084 mm, whereas the samples produced using the die of FIG. 2 had a thickness of between 0.06 to 0.11 mm.

The results of water permeability, tear and stretch burst test tests conducted on the samples are shown in Table V.

TABLE V

| | Ultrafiltration (**) | Stretch Burst Pressure (mm Hg) | Stretch Burst Dia. at burst (mm) | Tear Strength* gm/0.1 mm MD | Tear Strength* gm/0.1 mm TD |
|---|---|---|---|---|---|
| Nonder. | 1.66 | 145 | 27.18 | 15.3 | 29.9 |
| Deriva. | 0.72 | 293 | 44.45 | 17.6 | 34.6 |

*average of 4
**(ml/Min/$M^2$/mm Hg)

Table V indicates that while water permeability (ultrafiltration) was higher for the casings of nonderivatized cellulose, the stretch burst and tear strengths of the nonderivatized cellulose casings produced with the modified nozzle were lower than the derivatized cellulose counterpart. It is believed that the lower stretch burst and tear strength of the nonderivatized cellulose casing as reported in Table V is attributable to both its higher ultrafiltration value (1.66 vs. 0.72) and higher glycerin content (38% vs 13–14%), because increasing both are known to have an adverse effect on casing strength. It further is believed the strength of casing of the nonderivatized cellulose would have been above that of the derivatized cellulose casing samples at equivalent glycerin content.

Draw Down Test

A draw-down test also was conducted to evaluate the suitability of the nonderivatized cellulose for use in the production of fibrous casing. The draw-down test is used to screen papers and viscose solutions to determine suitability for fibrous casing manufacture. In the test, a section of paper used in forming fibrous casing is placed on a flat plate. The liquid to be tested, usually a viscose solution, is poured onto the paper and the paper is drawn beneath a metering bar which squeezes the liquid to a uniform thickness over the paper surface. The coated paper is stretched over a hoop and immersed in a coagulating and regenerating solution, rinsed and then dipped into a bath containing a glycerin solution. An examination then is made to determine whether the coating liquid has penetrated and bonded with the paper. Both of these characteristics are essential for successful fibrous casing manufacture. If penetration and bonding are observed, then the materials would be suitable for manufacturing a fibrous casing.

For purposes of testing the nonderivatized cellulose, the NMMO-cellulose dope as described above was melted at 105° C. and diluted with a 78% NMMO aqueous solution to produce a solution containing about 5% by weight of cellulose. A sheet of conventional viscose bonded, long fiber 11 pound per ream weight hemp paper (0.030 mm thick) obtained from C. H. Dexter Co., Windsor Locks, Conn. and used in making commercial fibrous cellulose casing was placed on a flat plate and heated to 105° C. The solution was poured onto the paper and the paper was drawn under a horizontal bar spaced 1.02 mm above the plate so the paper was coated with the solution to a thickness of slightly less than 1 mm. After a few seconds the hoop was immersed into flowing tap water for about 10 minutes to precipitate the cellulose. The hoop then was immersed into a 10% glycerin solution for fifteen minutes and oven dried at 105° C.

Visual inspection of the noncoated side of the paper indicated that there was acceptable penetration of the nonderivatized cellulose through the paper and the cellulose did bond to the paper. As noted above, these characteristics are essential for successful fibrous casing manufacture. So by this draw-down test, the nonderivatized cellulose is suitable for manufacturing a fibrous cellulosic casing. Also, the visual inspection surprisingly found no obvious deterioration of the paper substrate. This was unexpected because the solution applied to the paper contained NMMO, a cellulose solvent.

A second sample formed of a 7.3% derivatized (cellulose xanthate) solution was used in a draw-down test with the same 11 pound per ream weight paper. The bar was set to a height of 0.762 mm. While the coating was thinner, about the same amount of total cellulose was applied to the paper because the cellulose concentration of the solution was greater. The coating on the second sample was coagulated and regenerated by immersion in baths containing salts and sulfuric acid and then it was rinsed with water, treated with glycerin and dried.

Tensile tests were conducted on both samples as well as on a control consisting of the paper treated only with a 10% glycerin solution and dried. The results of tests conducted on 25.4 mm wide samples are reported in Table VI.

TABLE VI

| | Tensile Strength: Thickness After Drying (mm) | Tensile Strength: Load at Failure (kg) |
|---|---|---|
| Control | 0.030 | 2.8 |
| Sample 1* | 0.210 | 5.5 |
| Sample 2** | 0.125 | 7.8 |

*Paper coated with nonderivatized cellulose
**Paper coated with derivatized cellulose (viscose)

The results of the test show that the nonderivatized cellulose and the viscose add-on both increased the load bearing ability of the casing over uncoated paper, although the increase of the sample coated with nonderivatized cellulose was less. The load at failure for Sample 1 formed of the nonderivatized cellulose was about 70% the load at failure of the derivatized cellulose sample. Despite this lower value it is believed that the penetration and bonding characteristics indicate that a commercially acceptable fibrous casing can be formed of the nonderivatized cellulose because the nonderivatized cellulose improved the strength of the base paper and this would be sufficient to satisfy the strength needs of fibrous casing users.

Both fibrous and nonfibrous casings used in the food industry, specifically the meat industry, are often coated with various substances or have these substances incorporated into the casing itself. Examples include nonreleasable coloring substances that are incorporated into the casing and produce casings of various colors; pigments or dyes that are used to imprint a design or wording onto the outside surface of the casing; food grade coloring agents that are releasable from the casing and are transferable to the encased food; liquid smokes used to give a smoky flavor and coloring to meat products; and peeling aids that are substances that allow the casing to be easily released from the cooked meat product. All of these types of substances are well known to those skilled in the art of casing manufacture and meat packaging. These agents and substances may also be used for the same reasons and in the same ways with both fibrous and nonfibrous casings made from nonderivatized cellulose of the present invention.

During the manufacture of sausages, the meat emulsion is stuffed into the casing and then cooked. Following cooking, the casing is peeled to release the sausage. Casings that have a nonreleasable color make it easier for the sausage manufacturer to spot casing that has not peeled off the sausage. This is particularly important in present day high volume commercial operations where specialized machines slit and remove the casings from the processed sausages.

In order to produce the colored casing, the coloring agent is introduced into the cellulose solution prior to extrusion from the die and the coloring agent becomes an intrinsic part of the casing.

In the area of colored casing, blue casing is a casing that is readily available. Phthalocyan blue pigment is the agent incorporated into the extrudate that colors the casings blue.

Casing that is colored as above but additionally has a clear window is advantageous in that the window allows the sausage manufacturer to monitor the progress of the cooking of the sausage, while the colored portion of the casing is readily seen if left on the sausage after peeling.

Another variation of a solid blue casing is one that has multiple sections of the casing that remain clear. Some casings contain a stripe, again used for visibility on the cooked sausage.

Casing with colors other than blue are possible to produce. Examples of some pigments and dyes used to color casings are chromophthal red (Color Index or "CI" 65300), phthalocyanine green (CI 74260), routile white or titanium dioxide (CI 77891), pigment violet, perylene maroon (CI 71130), carbon black (CI 77266), irgazin yellow (CI 56280) and mixtures thereof.

Coloring agents such as dyes, inks, and pigments are also used on the surface of casing to print words or designs. These can include identification of the sausage manufacturer, identification of the type of sausage, and the logo of the manufacturer. The coloring agents used for this type of printing includes the pigments enumerated above, and the many others that are known to those skilled in the art of printing on food grade casings, such as, permanent red (CI 12475), orange (CI 21110), and carbazole violet (CI 51319).

Coloring agents may also be applied to the casing in such a way that the color is released from the casing and transfers to the encased food, usually after processing. The combination of heat and moisture used in processing meat-stuffed casings, especially the casings that are moisture permeable, assist in transferring food grade color on the casing to the meat. Colors so transferred include reds, such as cherry coloring and deep red, such as liquid smoke, and yellows. The specific food grade coloring agents are well known to those skilled in the area of producing these types of coloring agents and to those versed in the applicable regulations as promulgated by the US Food and Drug Administration.

As stated above, liquid smokes may be incorporated in casings of the present invention. These may be used to economically produce darker smoke colored casings. Such darker casings have increased eye appeal in markets where the meat processor sells the product with the casing left on. Liquid smoke is also used to give a smoky flavor to the encased meat. Both tar containing and tar depleted liquid smokes may be used on both nonfibrous and fiber-reinforced casings. These casings may or may not also have other coatings such as peeling aids. Acidic, neutralized, or alkaline liquid smokes may be used. In one preferred embodiment for nonfibrous casing, tar-depleted liquid smoke treated casing is made utilizing an acidic tar-depleted concentrated liquid smoke prepared, e.g., in accordance with the teaching of U.S. Pat. No. 4,540,613.

Liquid smoke can be externally applied to the casing using a dip tank or a foam applicator. An example of this is the process disclosed in U.S. Pat. No. 4,356,218. Casing may also be "slugged" with liquid smoke, that is, an aliquot of a liquid smoke solution is put inside a length of casing, contacts the walls of the casing as the casing moves through the slug and in this fashion coats the inner surface of the casing.

Preferably the casing will have been treated prior to addition of the liquid smoke with phosphates to inhibit formation of black spots or discoloration, e.g., in accordance with U.S. Pat. No. 4,511,613. Beneficially, the casing is treated with a base prior to addition of the acidic liquid smoke such that upon drying of the liquid smoke treated casing and prior to shirring, the casing has a Ph value of from about 5 to 6. The descriptions and teachings of U.S. Pat. Nos. 4,540,613, 4,356,218, and 4,511,613 are hereby incorporated by reference. Suitably, the tardepleted smoke treated casings will contain at least 2 mg., and preferably at least about 5 mg. or more of smoke constituents per square inch of food casing contact area. Tar containing liquid smokes may also be used, particularly in fiber reinforced casings.

Pre-shirring moisturization is most commonly accomplished by means of a spray applied to the casing inner wall. This spray may include humectants such as propylene glycol to retard the rate of water uptake as, for example, described in U.S. Pat. No. 3,981,046, or peeling-aid solutions.

Such peelability enhancing agents include, but are not limited to, carboxymethyl cellulose and other water soluble cellulose ethers, the use of which is disclosed in U.S. Pat. Nos. 3,898,348 and 4,596,727, the disclosures of which are incorporated herein by reference in their entireties; "Aquapel", a Hercules, Inc. trademarked product comprising alkyl ketene dimers, the use of which is further disclosed in U.S. Pat. No. 3,905,397, the disclosure of which is incorporated herein by reference; and "Quilon", an E.I. Dupont de Nemours Co., Inc. trademarked product comprising fatty acid chromyl chlorides, the use of which is further disclosed in U.S. Pat. No. 2,901,358, the disclosure of which is incorporated herein by reference.

As previously described, it is known in the art that ease of peeling of the casing, particularly for skinless frankfurters, is directly related to skin formation and production of a liquid layer or coating between the casing and the "skin" of the sausage. Under some conditions, peeling the casing from the processed sausage has presented problems, particularly in the production of so called "skinless" frankfurters where large numbers of the product are involved and especially in commercial operations using high-speed automatic stuffing and peeling machines.

When the casing is removed from the meat mass by automatic high-speed peeling machines, there is occasionally a tendency for some meat to adhere to the casing and be torn from the sausage with the casing, thereby causing surface marring of the sausage. In other instances, variations in the meat emulsion formulations or in the processing conditions can result in a degree of adherence of the casing to the product which hinders rapid removal of the casing from product encased therein. The use of high-speed, automatic peeling machines in commercial operations, for example, as disclosed in U.S. Pat. Nos. 2,424,346, 2,514,660, 2,686,927, 2,757,409, 3,312,995, 3,487,499, and 3,608,973, makes it particularly essential that there be minimal resistance to the separation of casing from sausage, or the product will jam at the peeler or go through unpeeled. Less than complete removal of the casing necessitates the expense and inconvenience of hand sorting and peeling.

Many attempts have been made to provide casings having easy release characteristics. It is known in the art, as disclosed, for example, in U.S. Pat. Nos. 2,901,358, 3,106,471, 3,158,492, 3,307,956, 3,442,663, and 3,558,331, that the application of certain types of coatings to the inside wall of food casings may afford improvement in the release characteristics of the casing from the encased sausage product. Use of peeling aids or release coatings have helped to overcome these peelability problems. Following cooking, cooling and hydrating, water-soluble cellulose ether containing peeling aids help release the casing from the frankfurter skin by formation of a slippery layer between the casing and the frankfurter skin.

Typical water-soluble cellulose ethers which may be employed are the nonionic water-soluble alkyl and hydroxyalkyl cellulose ethers such as, methylcellulose, hydroxypropyl methylcellulose, hydroxypropylcellulose, ethyl methylcellulose, hydroxyethylcellulose and ethyl hydroxyethylcellulose and preferably the anionic water-soluble cellulose ethers such as, carboxymethylcellulose and carboxymethyl hydroxyethylcellulose. Mixtures of nonionic and anionic water-soluble cellulose ethers may also be employed. Commercially, carboxymethylcellulose (CMC) and carboxymethylhydroxyethylcellulose are almost always sold as the sodium salt, and it is well established trade practice not to refer to the commercial product as the sodium salt. For the purpose of this application, reference to these anionic materials shall include salts thereof, e.g., the sodium salt and other alkali metal salts thereof.

The amount of water-soluble cellulose ether present on the internal surface of the food casing can vary over a wide range, although very small quantities are actually required. In general, tubular casings of the present invention will contain at least about 0.001 mg of cellulose ether per square inch of casing surface (0.0002 mg/cm$^2$), and preferably between about 0.002 mg/in$^2$ and 0.09 mg/in$^2$ (0.0003–0.014 mg/cm$^2$) of said cellulose ether. Especially preferred are casings having a coating on the internal surface thereof between about 0.03 mg/in$^2$ and 0.07 mg/in$^2$ (0.005–0.011 mg/cm$^2$) of said cellulose ether. Greater amounts of the cellulose ether component may be used, if desired, although generally it will not materially improve the release characteristics of the casing and with certain types of meat formulations or processing conditions, fat separation may be encountered.

Peeling aid coatings will typically comprise a release agent such as a water-soluble cellulose ether as described above in combination with an anti-pleat lock agent.

Anti-pleat lock agents suitable for use in admixture with peeling aid release agents, such as water soluble cellulose ethers, to prepare easy peeling coatings on the casings of the present invention include synthetic, natural, and modified oils including mineral, vegetable and animal oils such as refined animal and vegetable oils that are normally liquid at room temperature or have a melting point below about 100° F., food grade mineral oil, silicone oils and medium chain triglycerides. Also suitable as an anti-pleat lock agent are substances such as lecithin and derivatives thereof. Materials that are or may be placed in a dispersible form in media solutions have been found to be suitable. Typical of this type of material would be an aqueous emulsion of castor oil or mineral oil. Particularly suitable and preferred as an anti-pleat lock agent is mineral oil.

An "anti-pleat lock agent" is a material that is capable of promoting deshirring of pleats by minimizing any tendency of the pleats of a shirred casing stick to unduly adhere to each other and thereby damage the casing by creation of pinholes, tears or breaks during deshirring and stuffing. The anti-pleat lock agent will preferably be effective in the presence of a water soluble cellulose ether such as carboxymethylcellulose, which is known to promote adhesion of pleats prior to deshirring.

Suitable amounts of anti-pleat lock agent such as mineral oil will be present on the inner surface of the casing in order to effectively assist in deshirring and to reduce deshirr forces. Suitable amounts of an anti-pleat lock agent, preferably mineral oil, may range from about 0.05 mg/in$^2$ to about 0.3 mg/in$^2$ or more (0.008–0.047 mg/cm$^2$), and preferably will be from 0.1 to 0.2 mg/in$^2$ (0.016–0.031 mg/cm$^2$).

Lecithin, an amphoteric emulsifier, is an anti-pleat lock agent which may also act as a surfactant with both wetting and emulsifying properties. It may also promote peelability of the casing. Lecithin is known to function as a release aid, dispersant, lubricant, softener and to control viscosity in various food industry applications. As used herein, the term "lecithin" includes both unsubstituted lecithin and substituted lecithin which has been modified by chemical means and the individual phospholipid constituents thereof, particularly phosphatydylcholine.

Since lecithin may be utilized as an anti-pleat lock agent or possibly to enhance or potentiate a peeling aid, the amount of lecithin present on the internal surface of the casing may vary over a wide range. In general, the preferred tubular casings of the present invention will contain sufficient lecithin to effectively and favorably impact upon peelability and/or the deshirr forces. The water-soluble cellulose ether and lecithin combination, particularly with an anti-pleat lock agent such as mineral oil and a surfactant such as ethoxylated monodiglycerides may show improved peelability, relative to peeling aid compositions without lecithin. Suitable amounts of lecithin may range from about 0.05 to 0.50 mg/in$^2$ and preferably range from about 0.1 to 0.2 mg/in$^2$.

Surfactants suitable for use in the coating compositions on casings according to the present invention include those surfactants which act as wetting agents for the cellulosic casing surface and/or as emulsifying agents for oil such that the surfactant facilitates dispersion of the coating composition across the surface of the cellulosic casing. Examples of suitable surfactants include water dispersible or at least partially water-soluble surfactants such as alkylene oxide adducts of either fatty acids or partial fatty acid esters, ethoxylated fatty acid partial esters of such polyols as anhydrosorbitols, glycerol, polyglycerol, pentaerythritol, and glucosides, as well as ethoxylated monodiglycerides, sorbitan trioleate, lecithin and aliphatic polyoxyethylene ethers such as polyoxyethylene (23) lauryl ether.

Preferred surfactants include polyoxyethylene sorbitan fatty acid esters or mixtures thereof such as those sold under brand name "Tween" (available from ICI Americas Inc. of Wilmington, Del.), such as Tween 80 (polyoxyethylene 20 sorbitan monooleate), ethoxylated monodiglycerides or mixtures thereof such as those sold under the brand name Mazol 80 MGK (available from Mazer Chemical, Inc. of Gurnee, Ill.), sorbitan trioleate (available from ICI Americas Inc. under the brand name Span 85), and lecithin. An especially preferred surfactant is a mixture of ethoxylated monodiglycerides such as Mazol 80 MGK. Some surfactants are also known to act as anti-pleat lock agents, e.g., lecithin and Tween 80.

Suitable amounts of a surfactant may range from about 0.005 to about 0.06 mg/in$^2$ (0.0008–0.0009 mg/cm$^2$) and preferably, for a surfactant such as Mazol 80, from about 0.01 to 0.02 mg/in$^2$ (0,002–0,003 mg/cm$^2$). Too little surfactant may lead to an uneven distribution of the coating composition on the casing surface.

U.S. Pat. No. 3,898,348 describes the coating of internal surfaces of cellulose sausage casings with a homogeneous mixture of a water-soluble cellulose ether and an additive selected from animal, vegetable, mineral, and silicon oils and alkylene oxide adducts of partial fatty acid esters.

U.S. Pat. No. 4,137,947 discloses a method of improving the meat release or peelability of cellulose sausage casings by the application of a meat release coating to the internal surface thereof.

Japanese Patent Application Publication No. 55141(1984) discloses easy peeling coatings which produce casings which are easily deshirred without blocking.

Improvements have been made to the method of making casing from nonderivatized cellulose as described above, having a 0.80–1.20 mils wall thickness and are described in detail in U.S. Ser. No. 08/179,418, which is incorporated by reference herein. The particular improvement to the earlier described method comprises drawing the extruded tube through an air length or air gap of at least about six inches in length so as to form the cellulose tube with high transverse direction tensile strength. This improvement provides cellulose tubes with TD tensile strength of at least about 2.0 lbs/in-mil and a MD/TD tensile strength ratio not exceeding about 2.

Seamless cellulose tubes were made from nonderivatized cellulose using the improved method. The starting materials were as described above, a dope obtained from Courtaulds Research Ltd. of Coventry, England, which was ground to a particle size of less than about 3.2 mm in diameter. As above, the dope was fed through a heated extruder and then through a screen pack. The fully molten blend was downwardly extruded through a die-mandrel assembly and was discharged from the annular orifice to form a seamless tube of at least 12.7 mm diameter, and into a first bath of nonsolvent liquid of 85% water and 15% NMMO. During this movement, a solution of 30% NMMO and water was introduced into the interior of the extruded seamless tube generally as described above and as shown in FIG. 3 to supply an "internal bath" within the extruded tube. The liquid for this internal bath was introduced from an external supply container maintained at controlled temperatures. In the course of this flow down on the mandrel, the stream contracted the inner surface of the extruded tube, thereby providing an internal bath.

The nonsolvent liquid forming the internal bath flows downwardly and cocurrently with the inner surface of the downwardly moving extruded seamless tube of nonderivatized cellulose-NMMO-water and into the first bath as the extruded tube moves through the air path length or air gap of approximately 6". Air path lengths up to 11" were also used to successfully produce the cellulose tube. When this air path length is increased from a relatively short distance, as for example, 50 mm (1.97"), to at least about 6" or more, the cellulose tube's TD tensile strength is substantially increased and approaches the tube's MD strength, so that the MD/TD tensile strength ratio preferably does not exceed about 2 and most preferably does not exceed about 1.5.

The extruded solution tube was inflated with air during start-up as it dropped from the annular orifice and passed over the mandrel.

In preparing the samples of nonderivatized cellulose casing for testing, the first bath consisted of 85% water and 15% NMMO at a temperature of 65° F. This bath contained nine rolls of which one was idle and eight were driven. The rolls were longitudinally aligned with their axes of rotation normal to the longitudinal movement of the tube from end-to-end of the first bath.

The first bath liquid level was maintained above the mandrel enlarged lower end but never above the largest diameter portion of the mandrel.

From the first bath, the extruded tube was moved through a washing trough. The purpose of the washing trough is to continue the direct contact between nonsolvent liquid, eg., water, and the precipitating cellulose-containing tube so as to further precipitate the nonderivatized cellulose from solution and form a cellulosic tube.

Following the washing trough, the cellulosic tube enters a second bath or wash tub. The liquid found in this tub was 135° F. water, used to complete solvent removal from the tube. Finally, the tubing was pulled out of the tub by means of mechanically-driven nip roll and samples were collected in a quiescent water soak bath at ambient temperature. Following washing, the cellulose tube samples were soaked in a 10% glycerin and 90% water solution for at least 8 minutes. The samples to be tested were then dried.

Example 1. Addition of Peeling Agents

Tests were run to compare the effectiveness of peeling agents on casings made from both derivatized cellulose and nonderivatized cellulose. The casings used in this example and all of the following examples were made by the viscose process from derivatized cellulose, identified as NoJax®, and from nonderivatized cellulose, identified as "NDC", and prepared generally as described above. The NoJax® casing is a standard product of the Viskase Corporation and is commercially available with and without liquid smoke.

A. Test 1

Of about 3,600 feet of NDC casing produced, three shirred sticks, each about 15" long, were made. Stick 1 had an average wet thickness of 3.49 mils, Stick 2, 2.61 mils and Stick 3, 2.14 mils. Each stick was divided into two parts, A and B. The A halves were stuffed to a standard fullness, while the B halves were more fully stuffed. The control was a stick of 25N NoJax® with an average wet thickness of 2.25 mils. All sticks were shirred and sprayed during shirring with a peeling aid solution of water, propylene glycol, carboxymethyl-cellulose, Mazol 80, and mineral oil.

The sticks were stuffed with a meat emulsion and approximately 18–20 sausage links were made from each half stick. They were cooked at 35% RH for 30 minutes at 140° F. and then at 180° F. to an internal temperature of 160° F. The links were then quenched in cold tap water and kept in the refrigerator in plastic bags over two days. The links were then peeled.

The results showed that the control, NoJax® 25N, produced normal frankfurters that peeled easily with no surface marring. Stick 1 produced some teardrop and some peanut shaped, obviously understuffed wrinkled sausages, but peeled as well as the control samples. Stick 2 produced markedly better looking, more uniform sausages than Stick 1, which also peeled as well as the controls. Stick 3 sausages appeared very close to the control frankfurters and also peeled as well as the controls.

B. Test 2

Eleven samples of shirred NDC casing coated with the peeling agent as above, three samples of shirred C20 NoJax® with the peeling agent and three samples without the peeling agent, three samples of shirred C25 NoJax® with the peeling agent and three samples without the peeling agent were tested for peelability. Each casing was stuffed with a high collagen emulsion obtained from the Real Sausage Co., Chicago, Ill., USA, and formed into sausage links. This emulsion contained 22 lbs beef chuck, 16 lbs. of beef tripe, 16 lbs of beef shank, 30 lbs. of regular pork trim at 50% fat, 2.25 lbs. salt, 1.0 lbs of spice, 0.25 lbs. of prague powder, and 22 lbs water. The stuffed casings were preshowered for 5 minutes with ambient tap water prior to processing at 30% RH and 3 minutes of smoking. The sausage links were processed by heating the links from 140° to 180° F. over 30 minutes, then at 180° F. for 30 minutes. This was done in an Alkar 2 Cage Batch Smoke House. Following this processing, they were shrouded and held overnight at 36° F. prior to peeling. The sausages were then peeled. The results are as seen in Table VII.

TABLE VII

| | Peelability | |
|---|---|---|
| SAMPLE NO. | DIAMETER (mm) | PEELABILITY % |
| C20 Peel*-1 | 19.06 | 100.00 |
| C20 Peel-2 | 19.09 | 96.55 |
| C20 Peel-3 | 19.17 | 96.41 |
| C20**-1 | 18.84 | 14.04 |
| CD-3 | 18.71 | 1.15 |
| NDA-1 | 19.31 | 16.00 |
| NDA-2 | 19.29 | 24.86 |
| NDA-3 | 19.50 | 81.55 |
| NDA-4 | 22.06 | 61.27 |
| NDA-5 | 20.47 | N/A |
| NDA-6 | 22.23 | 37.18 |
| NDA-7 | 22.78 | 38.75 |
| NDA-8 | 21.94 | 83.33 |
| NDA-9 | 21.57 | 89.40 |
| NDA-10 | 21.62 | 79.66 |
| NDA-11 | 22.49 | 89.51 |
| C25 Peel-1 | 22.72 | 89.76 |
| C25 Peel-2 | 22.49 | 97.52 |
| C25 Peel-3 | 21.61 | 97.62 |
| C25 - 1 | 22.24 | 15.35 |

TABLE VII-continued

| | Peelability | |
|---|---|---|
| SAMPLE NO. | DIAMETER (mm) | PEELABILITY % |
| C25 - 2 | 22.11 | 0.00 |
| C25 - 3 | 22.33 | 0.57 |

*Peel denotes peeling agent used.
**Absence of the work "peel" denotes no peeling agent used.

The number of sausages that peeled completely without marring the surface of the sausages were variable for the NDC casing, ranging from 16% to 89%. Peelability did not appear directly related to stuffing diameter. The control casing with the peeling agent had peelability rates of 89.76% to 100% while the control casing without a peeling aid had peeling rates from 0 to 15% C.

Test 3

Approximately 3000 feet of casing from nonderivatized cellulose was shirred into 30 sticks, each about 15 inches long. Each stick was spray coated with a peeling aid solution of 237 grams water, 53.75 grams propylene glycol, 3.38 grams carboxymethylcellulose and 0.85 grams Mazol 80 and 7.01 grams mineral oil by spraying the solution onto the inside of the casing as it was shirred into a stick.

The shirred casing was then stuffed with a high collagen emulsion and processed as in Test 2 above.

The results showed that although in general the NoJax® casing peeled off the sausages without marring the links, this formulation was not the optimal one for the NDC casing. Only a small percentage of the NDC links were able to be completely peeled without damage. However, this experiment did show that peeling aids coated onto the nonderivatized cellulose casing can aid in removing the casing from cooked sausages.

Although the results of Test 1 showed that the NDC sausages peeled as well as the NoJax® sausages, Tests 2 and 3 were not able to repeat these results. In both Tests 2 and 3, a percentage of the total links were peeled without damage, but never 100%. In comparison, the peelability of the NoJax® casings ranged from 89.76% to 100% in all three tests. These results illustrate that the casing made from derivatized cellulose and that made from nonderivatized cellulose do not react the same way with the peeling aids, nor can the two types of casings be expected to perform equally in all situations with all additives.

Example 2. Liquid Smoke Treatment of Casing

Four types of casings were tested for the transfer of liquid smoke from the casing to the cooked meat. Two casings were NoJax® and two were NDC.

Sixty-one feet of NDC and Nojax® casings were treated with liquid smoke by dipping for 3 minutes into a 10 mixture of 60% smoke, 34% water and 6% glycerin. These lengths of casing were then air inflated to a size 23 or 25N and air dried for 1–1.5 houvs. This treatment resulted in a smoke loading of approximately 11.1 mg/sq.inch and 9 mg/sq.inch for NoJax® and NDC respectively. Clear NoJax® and NDC casings had no liquid smoke added to them and were used as controls.

The links were cooked in an ALKAR 2 Cage Batch Smoke House, manufactured by Alkar, Lodi, Wisc., USA, by bringing up the temperature from 140°–180° F. over 30 minutes and then holding them at 180° F. and 40% relative humidity for 30 minutes prior to cold showering and shrouding overnight. Finally, the casings were removed from the sausages and evaluated for color transfer.

Fifteen samples of each casing were used in this experiment. The results are described in Table VIII below. A difference of two units between samples is required for visual difference.

TABLE VIII

Colorimetric Data for Clear and Smoked NoJax ® and NDC Casings

| | | L* | | a** | | b*** | |
|---|---|---|---|---|---|---|---|
| Sample | No. | Mean | SD$^{\alpha}$ | Mean | SD | Mean | SD |
| NDA clear | 15 | 64.66 | 0.39 | 5.59 | 0.62 | 14.76 | 0.44 |
| NoJ. clear | 15 | 63.92 | 0.37 | 6.32 | 0.75 | 15.39 | 0.41 |
| NDA Smoke | 15 | 59.70 | 1.03 | 7.81 | 0.87 | 17.19 | 0.48 |
| NoJ. Smoke | 15 | 58.39 | 0.79 | 9.27 | 0.78 | 16.77 | 0.43 |

*L = Describes darkness, 100 = white, 0 = black.
**2 = Describes degree of redness: higher values, more red; lower values, more green.
***3 = Describes degree of yellowness: higher values, more yellow; lower values, more blue.
SD$^{\alpha}$ = Standard deviation.

The clear controls were visually lighter and less red than the smoked samples. Visually, the clear controls were similar to each other, as were both the smoked samples.

The meat, without the casing, was also analyzed for the presence of smoke components. The composition of the meat was about 58.2% moisture, 25.7% fat, 13.4% protein and 2.5% ash. The results are given in Table IX below.

TABLE IX

Smoke Components of Clear and Smoke NoJax ® and NDC Frankfurters

| Sample | Acid - (mg/100 g) | Phenol - (mg/100 g) | Carbonyl - (mg/100 g) |
|---|---|---|---|
| NoJax Clear | 17.4 | 0.28 | 8.4 |
| NoJax Smoke | 38.4 | 0.28 | 9.3 |
| NDC Clear | 22.0 | 0.26 | 7.0 |
| NDC Smoke | 36.4 | 0.30 | 8.9 |

As shown above, the samples with the liquid smoke had higher acid and carbonyl levels than did the clear controls.

Therefore, even though the NoJax® and the NDC casings were made using different processes, both absorbed approximately the same amount of liquid smoke and transferred the liquid smoke to the cooked meat in approximately the same amounts, resulting in approximately the same amount of coloring and smoke components to the cooked meat. Good skin formation occurred on both the smoked NDC and NoJax® encased sausages.

Experiment 3. Production of a Blue Casing

As described above, it is possible and desirable to make casings of various colors. Coloring NoJax® casing is a basic operation to those skilled in the art. Generally, a dispersion of a pigment, such as phthalocyanine blue and water, is made. This aqueous solution usually includes other agents, such as wetting agents and emulsifiers. Once the dispersion is made, it is added to the viscose solution prior to extrusion of the film or casing and mixed. The colored casing or film is then extruded and the process continues.

It was not expected that the casing made from nonderivatized cellulose could be colored in the same fashion. As the solution prior to extrusion contains a large amount of NMMO in a small amount of water, about 78% NMMO in water, it is not an aqueous solution. It is believed that the addition of the aqueous color dispersion in the pre-extrusion stream would cause precipitation of cellulose, thereby blocking the extrusion of the film or casing.

In order to determine if nonderivatized cellulosic casing could be made in a nontransferable color, the following experiment was performed to make a nonderivatized cellulose film of a blue color.

139.5 grams of 784 NMMO/$H_2O$ and 69.5 grams of a dope containing 154 cellulose and about 80% NMMO and 5% $H_2O$ were combined. Next, 2.3 grams of a glycerin mixture of phthalocyanine blue pigment at about a 44 pigment level was added at 220° F. to the dope mixture and mixed. This was cast into a film and regenerated with cold water, giving a blue film with even color throughout, made from pigmented nonderivatized cellulose.

By producing this casing, it was shown that casings made of nonderivatized cellulose can be made in various colors, and that the addition of coloring agents, not in an aqueous dispersion, to the dope should not affect the production of the final casing.

Experiment 4. Printing

Studies were done to determine if the casing from nonderivatized cellulose (NDC) would accept and retain print as well as does casing made from derivatized cellulose (NoJax®).

Although the numbers of choices of coloring agents useful in printing casing is extremely large, it is a list that is well known to those skilled in the art of printing. For this experiment, isocyante reacted standard white and red inks were printed on NoJax® and NDC casings. These ink solutions were printed onto 3 feet lengths of casing, and the solvent was removed by blowing on the casing with hot air. The printed casings were followed by a 72 hour cure at ambient temperature.

The resistance to ink loss by abrasion and the degree of adhesion of the ink to the casing was tested by standard industry used Crinkle Resistance and Scotch® (registered trademark of 3M, St. Paul, Minn., USA) tape tests. The tests were performed as follows:

A. The Crinkle Resistance test

An 8×1.25 inch strip of both NDC and NoJax® casing that had been printed on in the middle 5 inches was soaked for 30 minutes in 100©F. tap water. Each strip was then removed from the water and rubbed between the scientists hands in a "scrubbing clothes motion", thereby abrading each sample to test for print rub-off.

The results of the test showed that NDC printed samples retained their print as well as did the NoJax® samples.

B. The Scotch® tape test

This test is used to determine if any ink is lost due to lack of adhesion of the ink to the casing. Printed samples of NDC and NoJax® casing as described in the Crinkle test above were used.

Strips of No. 610 Scotch tape were pressed onto the printed area of the samples. The tape was pressed down with the index finger and then quickly removed so that the maximum adhesion of the tape to the ink could occur.

The results of the test showed that the printed NoJax® and NDC samples behaved similarly and acceptably and resisted ink adhesion loss.

The results of both of these tests demonstrate that the NDC casing and the NoJax® casing exhibited similar reactivity to the ink system.

It should be appreciated that a food casing article of nonderivatized cellulose represents an advance in the art. Since no sulfur or sulfur compound is used or generated in forming the casing as described above, the resulting casing is sulfur free.

It also appears that the tear strength, water permeability and burst pressure of the nonderivatized cellulose casing are superior to a conventional food casing formed of a derivatized cellulose such as is formed by regenerating the cellulose from a cellulose xanthate solution. The nonderivatized cellulose casing can be printed on, coated with peeling aids, liquid smokes and a variety of other chemicals, and can be produced as colored material as is the conventional derivatized cellulose casing. However, properties do differ between the derivatized and nonderivatized cellulose casings in their reactions with and to various additives, particularly as seen above with the use of peeling aids. It can not be assumed that since a particular additive or coating agent works well with casing made from derivatized cellulose, it will necessarily do the same with casing made from nonderivatized cellulose.

Since there are no toxic or noxious by-products generated by the manufacture of the casing, the manufacturing process imposes no burden on the environment and represents an advance in the art of cellulose casing manufacture.

I claim:

1. A cellulosic food casing comprising a sulfur free seamless tubular film of nonderivatized cellulose precipitated from an amine oxide cellulose solution of cellulose dissolved in N-methylmorpholine-N-oxide (NMMO), wherein said casing is coated with an additive selected from the group consisting of a peeling aid, a coloring agent, and a flavoring agent.

* * * * *